3,355,355
ANTIVIRAL CYCLOALKYLAMINE COMPOSITIONS AND METHOD

Robert John Stedman, Paoli, Pa., assignor to Smith Kline & French Laboratories, Philadelphia, Pa., a corporation of Pennsylvania
No Drawing. Filed Feb. 5, 1965, Ser. No. 430,752
29 Claims. (Cl. 167—65)

The present invention relates to antiviral compositions containing cycloalkylamines and derivatives thereof and a method for their use.

Considerable effort has been directed toward the discovery of chemical compounds effective in inhibiting the growth of or in preventing infection by pathogenic microorganisms. Much success has been achieved in finding compounds which are able to combat such microorganisms as bacteria, fungi, and protozoa. Antiviral research, however, has been less fruitful, in part due to the close similarity in the structure of viruses and the structures of certain essential cellular components such as deoxyribonucleic acid and ribonucleic acid. Thus, compounds which destroy virus particles are often destructive of host cells.

A further problem in antiviral research is the difficulty in obtaining suitable test systems for the evaluation of antiviral agents.

It is therefore an object of the present invention to provide a method for inhibiting viral growth, preventing the pathological processes resulting from viral infection, and treating viral infections.

It is a further object of the present invention to provide antiviral compositions for practicing the above method.

The above objects are achived by the provision of pharmaceutical compositions containing as an active ingredient a cycloalkylamine of the following structure:

I 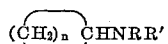

wherein:

$n$ is 6–11, and

R and R' are each hydrogen, lower alkyl, lower alkenyl, lower acyl, hydroxy lower alkyl, dilower alkylamino lower alkyl, phenyl lower alkyl, hydroxy, amino, carbamoyl, thiocarbamoyl, amidino, or, when taken together with the nitrogen atom to which they are attached, form a heterocyclic ring, with the proviso that when one of R or R' is hydroxy, amino, carbamoyl, thiocarbamoyl, or amidino, the other is hydrogen or lower alkyl.

A preferred group of compounds within the scope of Formula I possesses the following structure:

II 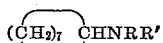

wherein R and R' are as defined above.

When used herein the terms lower alkyl, lower alkenyl, or acyl are intended to represent those groups having up to six carbon atoms.

Exemplary, therefore, of these cycloalkylamine compounds are cyclooctylamine, cycloheptylamine, cyclononylamine, cyclodecylamine, cycloundecylamine, cyclododecylamine, N-methylcyclooctylamine, N - ethylcyclooctylamine, N-propylcyclononylamine, N-isobutylcycloheptylamine, N-hexylcyclododecylamine, N,N-dimethylcyclooctylamine, N,N-dipropylcyclononylamine, N-acetylcyclooctylamine, N-formylcyclononylamine, N-propionylcycloundecylamine, N - hexanoylcyclooctylamine, N-allylcyclooctylamine, N-propargylcycloheptylamine, N-(2-hydroxyethyl)-cyclooctylamine, N-(3-hydroxypropyl)-cyclododecylamine, N-benzylcycloheptylamine, N-phenethylcyclooctylamine, N-(3 - phenylpropyl)-cyclodecylamine, N-hydroxycyclononylamine, cycloheptylhydrazine, N,N-tetramethylenecyclononylamine, N,N - pentamethylenecycloundecylamine, N,N-hexamethylenecyclododecylamine, N,N-ethylenecycloheptylamine, N-methyl-N-acetylcyclooctylamine, cyclooctylurea, cycloheptylthiourea, and cyclononylguanidine.

The compounds of the invention may be used in the form of their pharmaceutically acceptable, nontoxic acid addition salts, which are therefore part of the invention. Among these salts are the hydrochloride, sulfate, nitrate, hydrobromide, citrate, pamoate, maleate, cyclohexylsulfamate, acetate, tartrate, and succinate.

The cycloalkylamine compounds are either described in the literature or are prepared by conventional methods known to the art. Alkyl and dialkyl derivatives of cycloalkylamines are prepared by alkylating the primary amine with an alkyl halide. Examples of such halides are methyl iodide, ethyl iodide, propyl iodide, butyl bromide, and hexyl bromide. Also useful are allyl bromide, propargyl chloride, 3-dimethylaminopropyl bromide, 2-chloroethanol, benzyl bromide, and phenethyl chloride. The alkylations are performed generally in an organic solvent and in the presence of a base which serves as an acid scavenger. The mono and dialkyl products which frequently result from the reaction are separated by fractional distillation.

Acylated amines are prepared by treating the amine with an acyl halide or anhydride in the presence of a base. Among the useful reagents for forming the lower alkanoyl of up to 6 carbon atoms derivatives are, for examples, formic acid, acetic anhydride, propionic anhydride, butyryl chloride, and hexanoyl chloride.

An alternative method for the preparation of alkyl and dialkyl derivatives is the reaction of a cycloalkyl halide with the appropriate amine. An alternative method for the preparation of alkyl and acyl derivatives is the reaction of the sodium salt of an acylated cycloalkylamine with an alkyl halide. When, for example, N-acetylcyclooctylamine is treated with sodium hydride and then methylated with methyl iodide or sulfate, N-methyl-N-acetylcyclooctylamine is obtained. This compound can be hydrolyzed to give N-methylcyclooctylamine.

Another method for the preparation of acyl derivatives involves the reaction of a cycloalkyl halide with a nitrile or cyanide in the presence of a strong acid such as sulfuric acid. As an example, cyclononyl bromide can be treated with propionitrile to give N-propionylcyclononylamine. Such an acyl derivative may, of course, be reduced by means of lithium aluminum hydride in a high boiling solvent such as diethylene glycol dimethyl ether to the corresponding alkyl derivative.

Hydroxyalkyl derivatives are prepared by treating a cycloalkylamine with a hydroxyalkyl halide or with an epoxide such as ethylene or propylene oxide.

Compounds in which R and R', together with the nitrogen atom to which they are attached, form a heterocyclic ring are prepared by reacting a cycloalkylamine with a dihalide such as 1,4-dibromobutane and 1,5-dibromopentane. Alternatively, such a compound may be prepared by treating a cycloalkyl halide with a piperidine, or hexamethylenimine in the presence of a base.

Compounds in which R is carbamoyl, thiocarbamoyl, or amidino, are prepared by refluxing a cycloalkylamine or a salt thereof with urea, thiourea, or cyanamide, respectively, in a solvent, and then isolating the resulting product.

N-oxides of compounds of structure I are readily prepared by treating a cycloalkylamine with 30% hydrogen peroxide, and are to be considered as part of the present invention.

Salts of the cycloalkylamines are prepared by conventional techniques, including passing dry hydrogen chloride through a solution of the cycloalkylamine in an organic solvent or mixing separate solutions of the cycloalkylamine and the acid in organic solvents.

Quaternary ammonium salts of the cycloalkylamines are obvious variants of the invention and are readily prepared by means known to the art, e.g. treatment of an amine with an excess of an alkyl halide. Such compounds are considered part of the invention.

It is also to be understood that the present invention comprehends the prevention and/or treatment of viral diseases with any derivative of a cycloalkylamine which is metabolized in vivo to a compound specifically claimed. Since such compounds rely upon these conversions to claimed compounds for their activity, they are part of the present invention. Exemplary of these derivatives are Schiff bases.

Other compounds which are equivalent to the compounds disclosed in the foregoing disclosure are the simple homologs thereof. Examples of such compounds are the 1-methylcycloalkylamines [J. Am. Chem. Soc. 82:4663 (1960)]. The 2-methylcycloalkylamines and 2,8-dimethylcycloalkylamines are also exemplary of the homologs of the compounds disclosed. These compounds are prepared by procedures described in J. Am. Chem. Soc., 85:207 (1963), comprising forming an enamine of a cycloalkanone with pyrrolidine, alkylating with methyl iodide or sulfate, hydrolyzing to the ketone, forming an oxime, and then catalytically reducing the oxime to form the methylated cycloalkylamine. Other obvious homolog variations include 2,2-dimethylcycloalkylamines, preparable by base catalyzed alkylation of a 2-methylcycloalkanone and subsequent conversion to the amine. All these obvious homologous compounds are equivalent to the compounds specifically claimed.

The compositions are administered to a subject or host, either to prevent or treat a viral infection, by a variety of routes, including orally, by injection, or with the use of an inhaler or aerosol in effective, but nontoxic, doses, for example, about 0.5–700 mg., preferably 25–500 mg. of the active component when in tablet or capsule form, and 0.5–10 mg. when in an inhaler or aerosol. From 1 to 6 dosage units containing effective, nontoxic quantities of the active component may be administered daily.

Oral dosage forms can be in the form of tablets, capsules, troches or lozenges. In a tablet, the active antiviral component is generally incorporated in a solid carrier. Among the acceptable solid carriers are lactose, sucrose, magnesium stearate, stearic acid, starch, terra alba, talc, calcium phosphate, gelatin, agar, pectin, and acacia. A time delay material such as glyceryl monostearate or glyceryl distearate, alone or with a wax, may also be included. The tablet may be coated with materials such as methyl acrylate, methyl methacrylate, or shellac in order to form an enteric coating. The active antiviral component may be present in the composition in an amount of from about 1% to about 95%, although 25–75% is the preferred amount.

A capsule may be prepared by placing an active antiviral component, either alone or incorporated into a solid carrier in a hard gelatin capsule. Optionally, a time delay material may be included. The capsule can contain from about 1% to 100% of active antiviral component, although 25–60% is the preferred amount.

A liquid formulation may consist of the active antiviral component suspended or dissolved in a liquid carrier such as peanut oil, olive oil, sesame oil, or water. The liquid formulation may be consumed orally as such, included in a soft gelatin capsule, or placed in an ampule. The active antiviral component may be present in an amount of from about 0.5% to about 10%, although 5–10% is the preferred amount.

An injectable formulation may consist of a solution of the active antiviral component in normal saline solution, water, or sugar solution, possibly with preservatives such as Merthiolate or parabens added. The active antiviral component may be present in an amount of from about 0.25% to 25%, although 5–15% is preferred.

An inhaler may contain a volatile antiviral compound in admixture with aromatics such as oil of lavender, menthol, phenylethyl alcohol, or oil of wintergreen.

An aerosol formulation is prepared by combining an active antiviral component, optionally dissolved in a solvent such as alcohol, with propellants such as Freon 12 or 114, and packaging the formulation in a suitable dispenser.

An antiviral compound may also be incorporated into a dermatological preparation consisting of an ointment or other suitable vehicle.

In addition, for veterinary use, the active antiviral component may be added to any standard feed or feed supplement, in amounts ranging from about .0001% to 1%. They may also be mixed with vitamins, antibiotics, hormones, pigmentation factors, trace minerals, or growth factors.

The antiviral cycloalkylamines of this invention may, if desired, be generally combined with vitamins; analgesics such as dextro propoxyphene or ethoheptazine; antibiotics such as bacitracin, neomycin, polymyxin B, or gramicidin; antihistamines such as chlorpheniramine or tripelennamine; decongestants such as phenylephrine, phenylpropanolamine, or propylhexedrine; or antitussives such as caramiphen.

It will be understood that those skilled in the art of pharmaceutical chemistry will appreciate the many alternative ways of formulating the antiviral compositions of the present invention, and that the foregoing description and the specific examples which follow are to be considered only as exemplary thereof.

The cycloalkylamine compositions may be used to prevent or treat a wide variety of infections caused by viruses. Exemplary of these viruses are myxoviruses such as influenza A and A–2, swine influenza, parainfluenza 1, and Newcastle disease virus, poxviruses such as vaccinia and variola, Herpes viruses such as varicella (zoster) and pseudorabies, and picornaviruses such as rhinovirus.

The compositions may be used to prevent or treat viral infections in a variety of mammal and bird hosts or subjects. They are, for example, useful for preventing or treating Newcastle disease, swine influenza, or shipping fever.

The active components described above may also be used to prevent or counteract viral infections of laboratory animals such as mice, ferrets, rats, etc.

*Example 1*

An antiviral capsule has the following components:

cyclooctylamine hydrochloride _____mg__ 250
lactose, starch, or terra alba _____mg__ 250

The capsule is ingested by an infected host.

*Example 2*

An antiviral tablet has the following components:

cyclooctylamine hydrochloride _____mg__ 100
magnesium stearate _____mg__ 2.5
starch _____mg__ 15
terra alba _____mg__ 150
granulate with syrup or gelatin (5% solution)
 terra alba q.s. ad _____mg__ 300

The tablet is ingested.

Example 3

An antiviral sustained release capsule has the following components:

| | |
|---|---|
| cyclodecylamine hydrobromide | mg 300 |
| sugar pellets | mg 100 |
| calcium sulfate | mg 20 |
| coating materials: | |
| glycerylmonostearate | mg 5 |
| microcrystalline wax | mg 15 |
| glyceryl distearate | mg 45 |
| gelatin (5% solution). | |

The capsule is ingested.

Example 4

An antiviral composition incorporated into an inhaler has the following components:

| | |
|---|---|
| N,N-dimethylcyclooctylamine or cyclooctylamine | mg 250 |
| oil of lavender | mg 75 |
| menthol | mg 12.5 |

Example 5

An antiviral composition incorporated in an aerosol has the following components:

| | |
|---|---|
| N-ethylcyclononylamine | mg 20 |
| Freon 12 | mg 400 |
| Freon 114 | mg 1600 |

Example 6

An injectable composition is formed by dissolved 10 g. of cyclooctylamine hydrochloride in 100 ml. of normal saline solution, and adding 0.002% Merthiolate as a preservative.

Example 7

An antiviral composition incorporated into an aerosol spraypak has the following components:

| | |
|---|---|
| cyclooctylamine hydrochloride | g 10 |
| normal saline q.s. | liter 1 |
| package in polyethylene squeeze bottles. | |

The composition is injected into an infected host.

Example 8

An antiviral sustained release tablet has the following components:

| | |
|---|---|
| cyclooctylamine hydrochloride | mg 300 |
| sugar pellets | mg 100 |
| calcium sulfate | mg 20 |
| coating materials: | |
| glyceryl monostearate | mg 5 |
| microcrystalline wax | mg 15 |
| glyceryl distearate | mg 45 |
| gelatin (5% solution). | |

The tablet is ingested.

Example 9

*N-allylcyclooctylamine.*—To a stirred solution of 250 ml. of absolute alcohol, 25 g. of sodium bicarbonate and 16.4 g. of cyclooctylamine hydrochloride is added 12.1 g. of allyl bromide. The mixture is warmed and maintained at a temperature sufficient to cause the evolution of carbon dioxide until the gas evolution ceases. The mixture is cooled and filtered, and the solvent evaporated. Sodium hydroxide solution (10%) is added to the residue, and the basic mixture extracted with ether. The ether extracts are dried and evaporated to give an oil. Distillation of the oil gives a lower boiling fraction, N-allylcyclooctylamine, and a higher boiling fraction, N,N-diallylcyclooctylamine.

Example 10

When the following quantities of the listed reactants are employed in the procedure of Example 9, the corresponding products listed below are obtained.

| Reactants | Products |
|---|---|
| 16.5 g. hexyl bromide, 21.9 g. cyclododecylamine hydrochloride. | N-hexylcyclododecylamine and N,N-dihexylcyclododecylamine. |
| 16.6 g. 3-dimethylamino-propyl bromide, 21.9 g. cyclododecylamine hydrochloride. | N-(3-dimethylaminopropyl),cyclodoecylamine and N,N-bis(3-dimethylamino-propyl(cyclododecylamine. |
| 8.0 g. 2-chloroethanol, 16.3 g. cyclooctylamine hydrochloride. | N-(2-hydroxyethyl(cyclo-octylamine and N,N-bis(2-hydroxyethyl)-cyclooctylamine. |
| 17.1 g. benzyl bromide, 14.9 g. cycloheptylamine hydrochloride. | N-benzylcycloheptylamine and N,N-dibenzylcycloheptylamine. |

Example 11

*1-pyrrolidinocyclononane.*—A solution of 20.5 g. of cyclononyl bromide in 100 ml. of alcohol is added to a warm mixture of 7.1 g. of pyrrolidine and 21.2 g. of sodium carbonate in 100 ml. of alcohol, and the mixture is then refluxed for 1–2 hours. The reaction mixture is then poured into water and the aqueous solution then extracted with ether. The ether extracts are then dried and evaporated to give the title product.

Example 12

*N-methyl-N-acetylcyclooctylamine.*—To a solution of 16.9 g. of N-acetylcyclooctylamine in 75 ml. of tetrahydrofuran is added 6.75 g. of 53.5% sodium hydride, and the mixture is stirred and refluxed for four hours. A solution of 28.4 g. of methyl iodide in 75 ml. of tetrahydrofuran is then added slowly and the reaction mixture refluxed for twelve hours. The reaction mixture is then filtered and evaporated, and then taken up in water and ether. The ether extracts are then dried and evaporated to give the title product.

Example 13

*Cycloheptylhydrazine.*—A solution of 17.7 g. of cycloheptyl bromide in 100 ml. of ethanol is added dropwise to a refluxing solution of 10 g. of hydrazine hydrate in 100 ml. of ethanol, and the solution further refluxed for two hours. The mixture is then poured into a dilute sodium bicarbonate solution, and extracted with ether. The ether extracts are washed, dried, and evaporated to give cycloheptylhydrazine.

Example 14

*N-hydroxycyclononylamine.*—Cyclononanone is converted to its oxime by reaction with hydroxylamine hydrochloride and sodium carbonate in an aqueous system at room temperature. A solution of 15.5 g. of this oxime in 150 ml. of 80% ethanol containing 3.7 g. of hydrogen chloride is hydrogenated for three hours in a Parr apparatus at 50 p.s.i. in the presence of 0.5 g. of platinum oxide. The catalyst is filtered off, and the filtrate is diluted with water and then extracted with ether. The aqueous layer is made alkaline and then extracted with ether. The ether extracts are dried and evaporated to give the title product.

What is claimed is:

1. An antiviral composition in the form of a tablet, capsule, troche, or lozenge, comprising from 25–500 mg. of a member of the group consisting of a compound of the structure

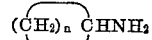

and the pharmaceutically acceptable, nontoxic acid addition salts thereof, wherein $n$ is a positive integer from 6 to 11 and a pharmaceutical carrier.

2. An antiviral composition in the form of a tablet, capsule, troche, or lozenge, comprising from 25–500 mg.

of a member of the group consisting of a compound of the structure

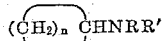

and the pharmaceutically acceptable, nontoxic acid addition salts thereof, wherein:
  n is a positive integer from 6 to 11, and
  R and R' are lower alkyl and a pharmaceutical carrier.

3. An antiviral composition in the form of a tablet, capsule, troche, or lozenge, comprising from 25–500 mg. of a member of the group consisting of cyclooctylamine and the pharmaceutically acceptable, nontoxic acid addition salts thereof and a pharmaceutical carrier.

4. A method of preventing viral infections selected from the group consisting of myxoviruses, poxviruses, Herpesviruses, and picornaviruses comprising administering to a susceptible mammal an effective, but nontoxic, amount of an antiviral composition comprising a member of the group consisting of a compound of the structure

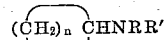

and the pharmaceutically acceptable, nontoxic acid addition salts thereof, wherein:
  n is a positive integer from 6 to 11, and
  R and R' are each selected from the group consisting of hydrogen, lower alkyl, and lower alkanoyl of up to 6 carbon atoms.

5. A method of preventing viral infections selected from the group consisting of myxoviruses, poxviruses, Herpesviruses, and picornaviruses comprising administering to a susceptible mammal an effective, but nontoxic, amount of an antiviral composition comprising a member of the group consisting of a compound of the structure

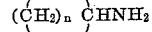

and the pharmaceutically acceptable, nontoxic acid addition salts thereof, wherein n is a positive integer from 6 to 11.

6. A method of preventing viral infections selected from the group consisting of myxoviruses, poxviruses, Herpesviruses, and picornaviruses comprising administering to a susceptible mammal an effective, but nontoxic, amount of an antiviral composition comprising a member of the group consisting of a compound of the structure

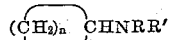

and the pharmaceutically acceptable, nontoxic acid addition salts thereof, wherein:
  n is a positive integer from 6 to 11, and
  R and R' are lower alkyl.

7. A method of preventing viral infections selected from the group consisting of myxoviruses, poxviruses, Herpesviruses, and picornaviruses comprising administering to a susceptible mammal an effective, but nontoxic, amount of an antiviral composition comprising a member of the group consisting of cyclooctylamine and the pharmaceutically acceptable, nontoxic acid addition salts thereof.

8. A method of treating viral infections selected from the group consisting of myxoviruses, poxviruses, Herpesviruses, and picornaviruses comprising administering to an infected mammal an effective, but nontoxic, amount of an antiviral composition comprising a member of the group consisting of a compound of the structure

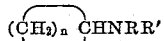

and the pharmaceutically acceptable, nontoxic acid addition salts thereof, wherein:
  n is a positive integer from 6 to 11, and
  R and R' are each selected from the group consisting of hydrogen, lower alkyl, and alkanoyl of up to 6 carbon atoms.

9. A method of treating viral infections selected from the group consisting of myxoviruses, poxviruses, Herpesviruses, and picornaviruses comprising administering to an infected mammal an effective, but nontoxic, amount of an antiviral composition comprising a member of the group consisting of a compound of the structure

and the pharmaceutically acceptable, nontoxic acid addition salts thereof, wherein n is a positive integer from 6 to 11.

10. A method of treating viral infections selected from the group consisting of myxoviruses, poxviruses, Herpesviruses, and picornaviruses comprising administering to an infected mammal an effective, but nontoxic, amount of an antiviral composition comprising a member of the group consisting of a compound of the structure

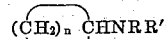

and the pharmaceutically acceptable, nontoxic acid addition salts thereof, wherein:
  n is a positive integer from 6 to 11, and
  R and R' are lower alkyl.

11. A method of treating viral infections selected from the group consisting of myxoviruses, poxviruses, Herpesviruses, and picornaviruses comprising administering to an infected mammal an effective, but nontoxic, amount of an antiviral composition comprising a member of the group consisting of cyclooctylamine and the pharmaceutically acceptable, nontoxic acid addition salts thereof.

12. A method of preventing myxovirus infections comprising administering to a mammal an effective, but nontoxic, amount of an antiviral composition comprising a member of the group consisting of a compound of the structure

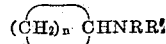

and the pharmaceutically acceptable, nontoxic acid addition salts thereof, wherein:
  n is a positive integer from 6 to 11, and
  R and R' are each selected from the group consisting of hydrogen, lower alkyl, and lower alkanoyl of up to 6 carbon atoms.

13. A method of preventing myxovirus infections comprising administering to a mammal an effective, but nontoxic, amount of an antiviral composition comprising a member of the group consisting of a compound of the structure

and the pharmaceutically acceptable, nontoxic acid addition salts thereof wherein n is a positive integer from 6 to 11.

14. A method of preventing myxovirus infections comprising administering to a mammal an effective, but nontoxic, amount of an antiviral composition comprising a member of the group consisting of cyclooctylamine and the pharmaceutically acceptable, nontoxic acid addition salts thereof.

15. A method of treating myxovirus infections comprising administering to an infected mammal an effective, but nontoxic, amount of an antiviral composition comprising a member of the group consisting of a compound of the structure

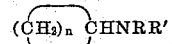

and the pharmaceutically acceptable, nontoxic acid addition salts thereof, wherein
  n is a positive integer from 6 to 11, and R and R' are each selected from the group consisting of of hydrogen, lower alkyl, and lower alkanoyl of up to 6 carbon atoms.

16. A method of treating myxovirus infections comprising administering to an infected mammal an effective, but nontoxic, amount of an antiviral composition comprising a member of the group consisting of a compound of the structure

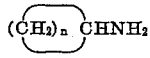

and the pharmaceutically acceptable, nontoxic acid additional salts thereof, wherein $n$ is a postive integer from 6 to 11.

17. A method of treating myxovirus infections comprising administering to an infected mammal an effective, but nontoxic, amount of an antiviral composition comprising a member of the group consisting of cyclooctylamine and the pharmaceutically effective, nontoxic acid addition salts thereof.

18. A method of treating influenza infections comprising administering to an infected mammal an effective but nontoxic amount of a compound of the structure

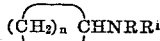

where $n$ is a positive integer from 6 to 11, and R and $R^1$ are each hydrogen or methyl; or a pharmaceutically acceptable acid addition salt thereof.

19. A method as claimed in claim 18, where the compound is cycloheptylamine or a pharmaceutically acceptable acid addition salt thereof.

20. A method as claimed in claim 18, where the compound is cyclooctylamine or a pharmaceutically acceptable acid addition salt thereof.

21. A method as claimed in claim 18, where the compound is cyclononylamine or a pharmaceutically acceptable acid addition salt thereof.

22. A method as claimed in claim 18, where the compound is cyclododecylamine or a pharmaceutically acceptable acid addition salt thereof.

23. A method as claimed in claim 18, where the compound is N-methylcyclooctylamine or a pharmaceutically acceptable acid addition salt thereof.

24. A method of preventing influenza infections comprising administering to a mammal an effective but nontoxic amount of a compound of the structure

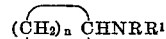

where $n$ is a positive integer from 6 to 11, and R and $R^1$ are each hydrogen or methyl; or a pharmaceutically acceptable acid addition salt thereof.

25. A method as claimed in claim 24, where the compound is cycloheptylamine or a pharmaceutically acceptable acid addition salt thereof.

26. A method as claimed in claim 24, where the compound is cyclooctylamine or a pharmaceutically acceptable acid addition salt thereof.

27. A method as claimed in claim 24, where the compound is cyclononylamine or a pharmaceutically acceptable acid addition salt thereof.

28. A method as claimed in claim 24, where the compound is cyclododecylamine or a pharmaceutically acceptable acid addition salt thereof.

29. A method as claimed in claim 24, where the compound is N-methylcyclooctylamine or a pharmaceutically acceptable acid addition salt thereof.

References Cited

FOREIGN PATENTS 831,185   3/1960   Great Britain.

OTHER REFERENCES

Andrewes: "Viruses of Vertebrates" The Williams and Wilkins Company, Baltimore, Md., July 24, 1964, pp. 222–223.

Chemical Abstracts 44, 5343d (1950).

ALBERT T. MEYERS, *Primary Examiner.*

JULIAN S. LEVITT, *Examiner.*

J. D. GOLDBERG, *Assistant Examiner.*